Feb. 10, 1925.

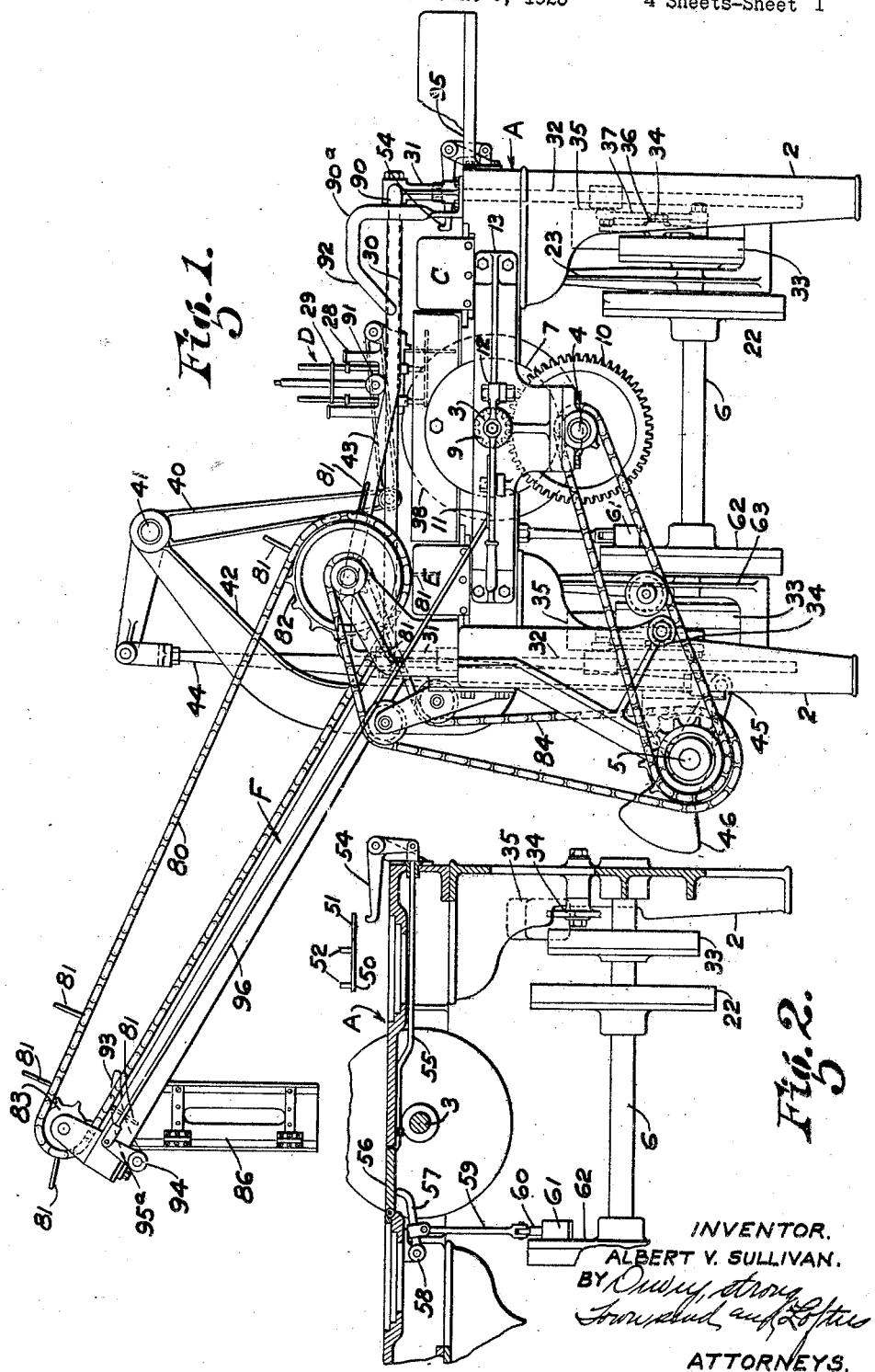

A. V. SULLIVAN 1,525,699

FISH CUTTING AND FEEDING MACHINE

Filed June 9, 1923   4 Sheets-Sheet 2

INVENTOR.
ALBERT V. SULLIVAN.

ATTORNEYS.

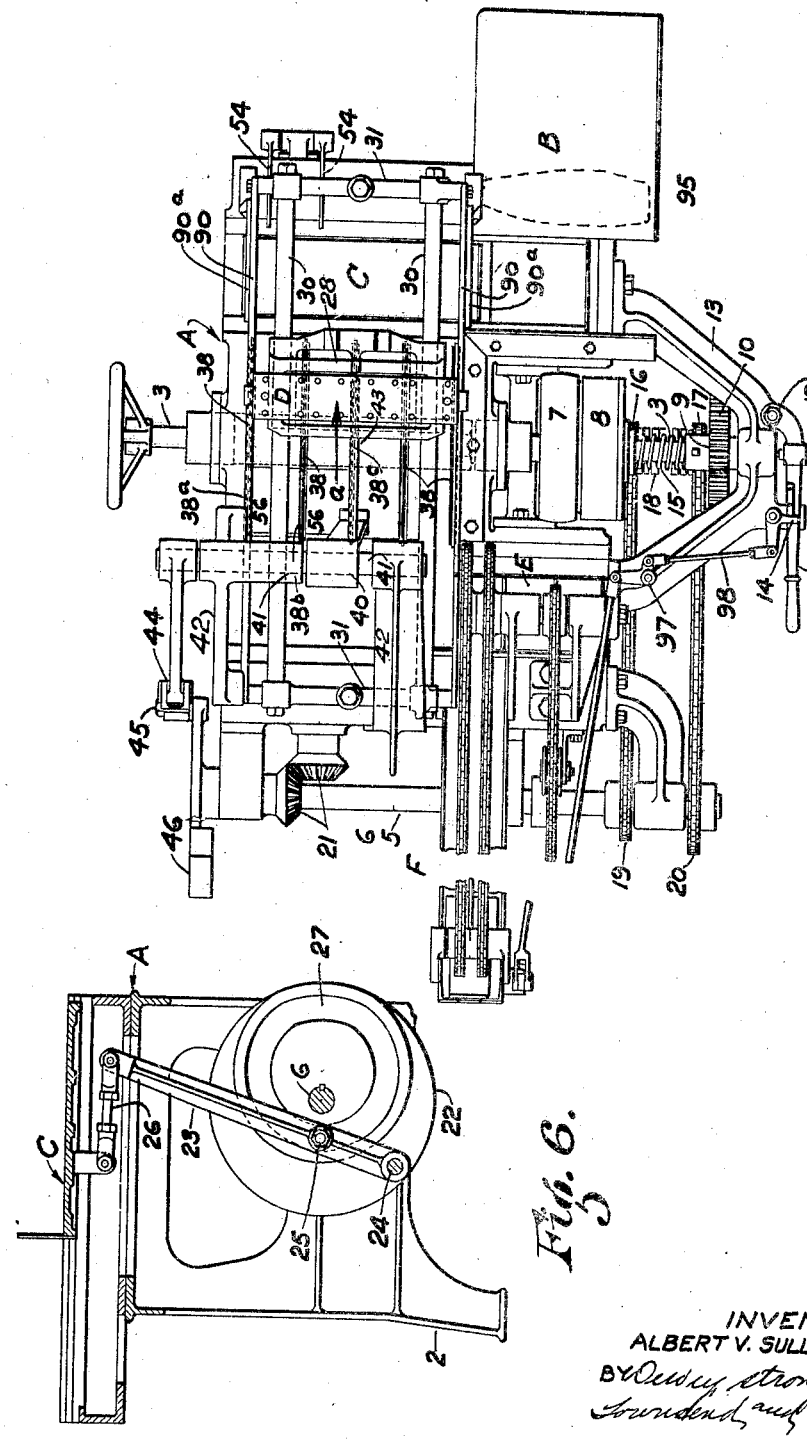

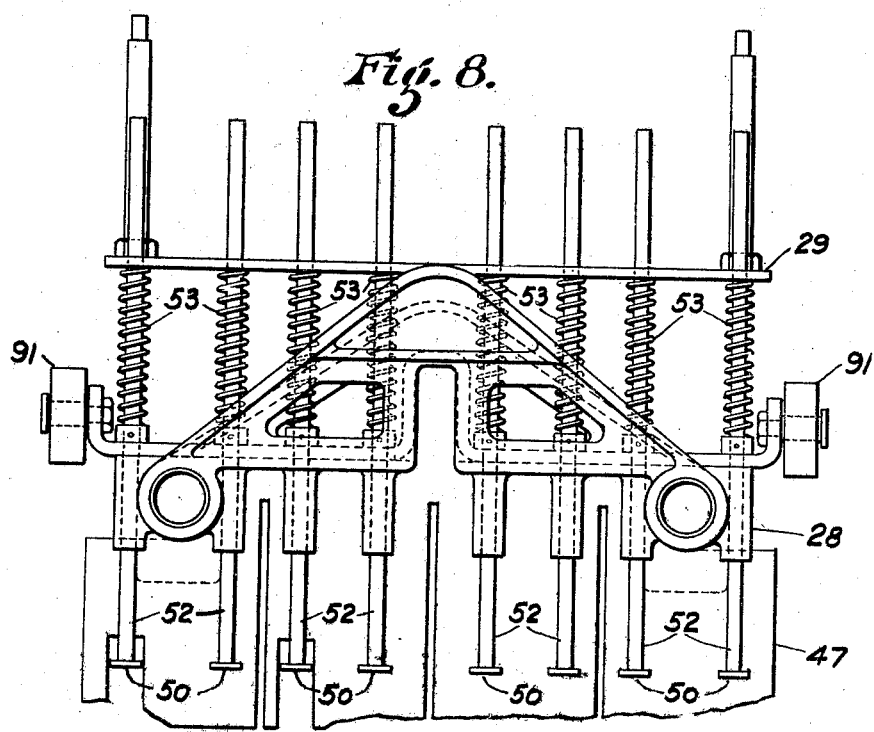
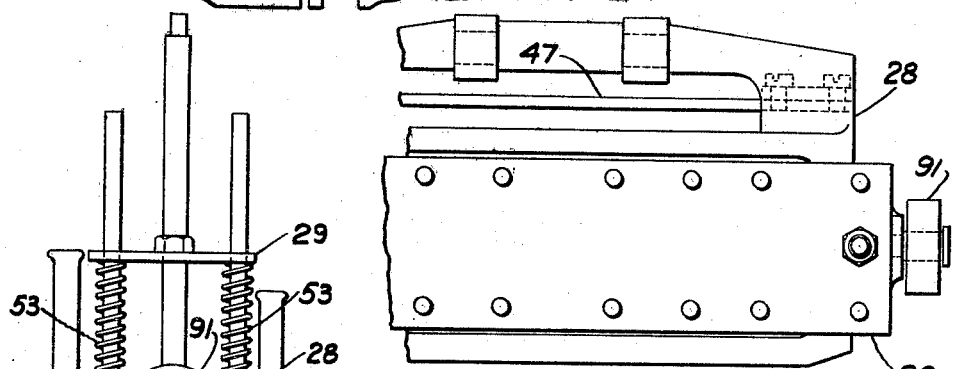
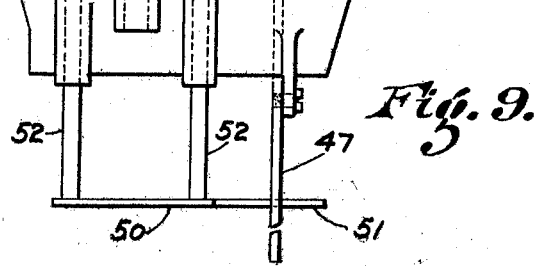

Patented Feb. 10, 1925.

1,525,699

UNITED STATES PATENT OFFICE.

ALBERT V. SULLIVAN, OF ALAMEDA, CALIFORNIA.

FISH CUTTING AND FEEDING MACHINE.

Application filed June 9, 1923. Serial No. 644,446.

*To all whom it may concern:*

Be it known that I, ALBERT V. SULLIVAN, a citizen of the United States, residing at Alameda, county of Alameda, and State of California, have invented new and useful Improvements in a Fish Cutting and Feeding Machine, of which the following is a specification.

This invention relates to a fish cutting and feeding machine.

The cutting of fish, such as salmon and the like, and the packing of the same in tin cans, are quite a problem, this being particularly true of the large canneries where thousands of tons of fish are handled every season as the dealers buying canned salmon demand a uniform pack both in regard to appearance and weight. This is difficult to maintain as the fish are not uniform in size, hence causing what is termed cross packing and uneven filling and consequently overweight and underweight of cans. A properly filled can should show the red or cut ends of the salmon both at the top and bottom of the cans, while a cross packed can shows the skin. It is very poor in appearance and is often rejected by the dealers. Overweight cans usually cause what is termed slack tops; slack tops being cans having little or no vacuum. The ends of overweight cans are also often strained during the process of cooking, thereby causing what is termed slug cans. These cans, to wit, slack tops and slugs, are in most cases a total loss. Underweight cans are thrown out of the automatic weighing machines and they are usually taken care of by adding a small chunk of fish; but this is not satisfactory as it spoils the appearance of the can content and often tends to produce overweight cans. To reduce cross-packs, over and under weights, etc., to a minimum, numerous operators are placed at different points, for instance, along the conveyors and chutes by which the fish is transferred from one point to another by the filling and cutting machines, etc. These operators position the fish by hand and they throw out tail pieces, etc. Handling of the fish does not promote sanitation; it adds to the cost of production and it does not entirely remedy cross-packing, over and under weights, etc.

The object of the present invention is to generally improve and simplify the construction and operation of machines such as are employed in the cutting, sorting, conveying and feeding of fish; to improve sanitation by eliminating all hand labor; to reduce the cost of production; to provide means for cutting the fish in predetermined lengths; to provide means for automatically ejecting underweight and tail pieces, etc., and further, to provide means for insuring correct positioning of the fish when delivered to the filling machine, thereby avoiding cross-packing. Other objects will hereinafter appear.

One form which my invention may assume is exemplified in the following description and illustrated in the accompanying drawings, in which—

Fig. 1 is a side elevation of the machine.

Fig. 2 is a central, longitudinal section partly broken away, said section showing one of the trap doors and the mechanism whereby it is actuated.

Fig. 5 is a plan view of the machine.

Fig. 6 is a cross-section partly broken away, showing the fish feeding carriage and the cam whereby it is actuated.

Fig. 7 is a plan view of the cutter feeding carriage.

Fig. 8 is an end view of the same.

Fig. 9 is a side elevation of Fig. 7.

Figure 3:
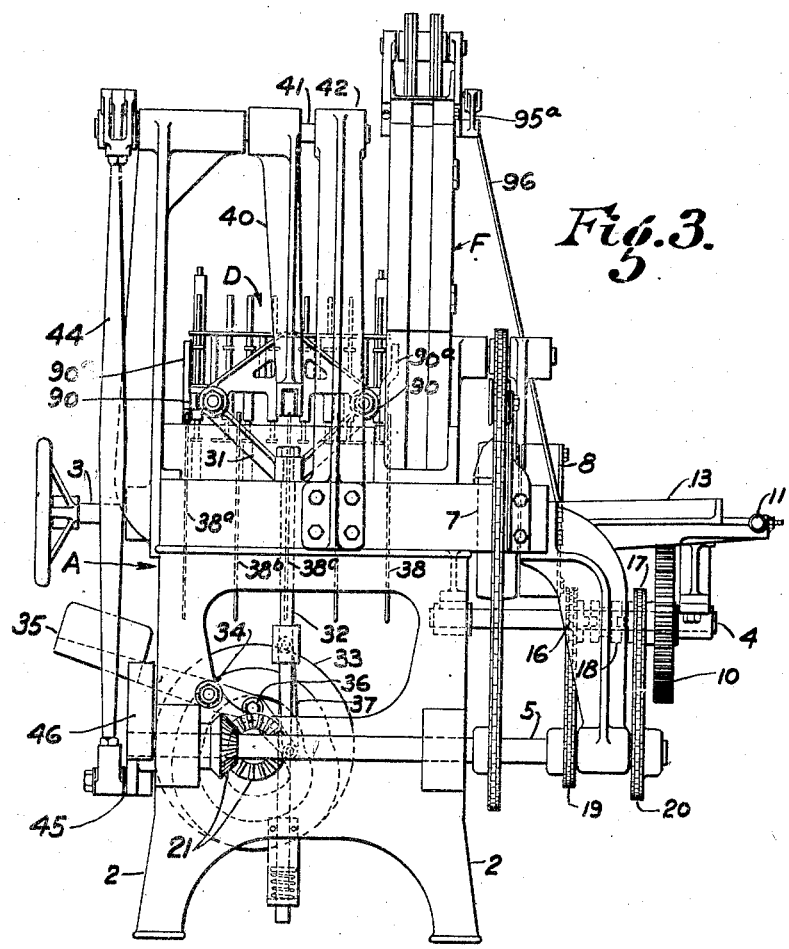
Fig. 3 is an end view of the machine.

Referring to the drawings in detail, and particularly to Figs. 1, 3 and 5, A indicates in general a table supported by legs such as indicated at 2. The table and legs form a frame in which are journalled a main driving shaft 3, a change speed driving shaft 4, an intermediate driving shaft 5, and a cam shaft 6. The shafts 3, 4 and 5 are journalled crosswise of the machine, while shaft 6 is disposed longitudinally thereof. The shaft 3 carries a loose pulley 7 which may be continuously driven. It also carries a friction clutch 8 of suitable construction whereby the pulley 7 is locked or released with relation to the shaft and it furthermore carries a spur pinion 9 which constantly meshes with a spur gear 10 secured on shaft 4.

The clutch 8 is actuated by a lever 11 pivotally supported as at 12 on an auxiliary frame or bracket arm 13. This lever is manually operated to throw the clutch into engagement, but it is automatically released by a trigger 14 as will hereinafter be described. Inward movement of the lever 11 into engagement with the trip latch 14 causes compression of a spring 15. This spring surrounds the shaft 3 and serves the function of throwing the clutch 8 into engagement. Release of lever 11 when the trip latch 14 is actuated permits outward movement of the spring 15 or extension of the same, and clutch 8 is thereby released. The pulley 7 is constantly driven by a belt not here shown and if clutch 8 is engaged, a constant turning movement will be transmitted to shaft 3. This movement is transmitted through the gears 9 and 10 to rotate the change speed drive shaft 4 and this shaft in turn transmits a continuous movement to shafts 5 and 6. Shaft 4 carries two sprocket gears which are perhaps best illustrated in Fig. 3, the gears being indicated at 16 and 17. Both gears are free on shaft 4 but they are adapted to be locked to the shaft by means of an intermediate jaw clutch generally indicated at 18. Shaft 5 similarly carries a pair of sprocket gears 19 and 20. The gears 16 and 17 are of the same diameter but sprocket gear 20 is larger than the sprocket gear 19, thus if power is transmitted to shaft 5 through the sprocket gears 16 and 19 a high speed will be transmitted, and if power is transmitted through the sprocket gears 17 and 20 and the cooperating chain, a low speed will be transmitted; that is, the machine is adapted to be operated at two speeds. If a large pack is being handled, the machine may be operated at high speed, but if the quantity of fish handled is small, the machine may be run at the lower speed.

Power is transmitted from shaft 5 to the cam shaft 6 through a pair of bevel gears such as indicated at 21. All shafts are continuously rotated, but the speeds of the shafts vary in proportion to the ratio of the gears and sprockets connecting the same.

The present machine serves several important functions, first, that of feeding the fish to a cutting position; secondly, that of cutting the fish into sections of predetermined length; third, that of discarding or ejecting short pieces or tail ends; fourth, that of properly positioning the fish sections to prevent cross-packing, and fifth, that of delivering the cut sections to the feed hopper of a filling machine. The fish to be cut is delivered in any suitable manner to a receiving table generally indicated at B. (See Fig. 5.) An operator is stationed at this point and advances the fish from the table B to a feeding carriage generally indicated at C. This carriage is disposed transversely of the table A and a reciprocal movement is imparted thereto, the feeding carriage C being perhaps best illustrated in Figs. 5 and 6. The movement of the carriage C is such that at one end of its stroke it aligns with the table B and there receives the fish. Its second position is at the opposite end of its stroke or that shown in Fig. 5, where it aligns with a cutter feeding carriage generally indicated at D. Reciprocal movement is transmitted to the carriage C from an internal cam 22 which is secured on the cam shaft 6. This internal cam actuates a lever 23 which is pivotally secured to the main frame as indicated at 24. A pin and roller 25 secured to the arm project into the cam 22 and a rocking movement is thus transmitted to the arm 23. This movement is in turn transmitted to the carriage C through a link 26. The internal cam is so shaped that a slight rest period is secured at each end of its stroke, the longest rest period being obtained when the carriage C aligns with the cutter feeding carriage D, and the shortest resting period being obtained when the carriage C aligns with the fish receiving table B. The long rest period of the cam is indicated at 27, and the short rest period at a point opposite thereto. The cutter feeding carriage D is perhaps best illustrated in Figs. 1, 5, 7, 8 and 9, the carriage consisting of two independent sections such as indicated at 28 and 29. The section 28 will hereinafter be referred to as the feeding carriage, and the section 29 as the feeler plate.

The carriage 28 forms a support for the feeler plate 29, and the carriage itself is in turn supported by a pair of guide rods 30, one disposed at each side of the carriage 28. The guide rods 30 are in turn supported by cross arms 31 disposed at each end thereof. These cross arms are in turn supported by vertically disposed rods 32. These rods are guided at each end of the frame and a certain amount of vertical movement is imparted thereto during the operation of the carriage 28. A reciprocal movement is also transmitted to the carriage 28 and the feeler plate 29. The reciprocal movement of the rods 32, cross arms 31 and the guide rods 30, is imparted through a pair of internal cams generally indicated at 33. These are disposed on opposite ends of the cam shaft 6 and rotate in unison therewith. The cams 33 are best illustrated in Figs. 1 and 3. A pair of rocker arms is pivotally supported on the ends of the frame as indicated at 34. A counterweight is disposed on one end of each rocker arm as at 35. A roller 36 is secured on the opposite end of each rocker arm and these rollers project into engagement with the internal cams 33. Rotation of the cams thereby imparts a rocking movement to the respective arms about their pivotal supports 34 and this rocking movement is transmitted to reciprocate the rods 32 through means of links 37.

Disposed below the guide rods 30 and secured on the main drive shaft 3 are a plurality of interspaced circular knives 38. The carriage D, or in other words the cutter feeding carriage, together with the feeler plate, is not only reciprocally mounted with relation to the cutting knives 38, but it is also vertically movable with relation thereto; the vertical movement being imparted by the cams 33, the rollers 36, links 37 and the rods 32; the vertical movement taking place when the carriage D travels in the direction of arrow $a$; (see Fig. 5) that is, the carriage D travels in an elevated position in the direction of arrow $a$ and it returns in a lowered position when reciprocal movement is transmitted thereto in a direction opposite to arrow $a$, and it is during this last named movement that fish delivered by the carriage C is removed and passed through the knives 38. The reciprocal movement on a horizontal plane, as far as the carriage D is concerned, is transmitted from a rocker arm 40 pivotally supported as at 41 on an upright bracket 42 forming a part of the main frame. One end of the rocker arm is attached to the carriage 28 by means of a link 43, while the opposite end of the rocker arm 40 is connected by means of a rod 44 with a crank pin 45 secured on a crank arm 46; this crank arm forming a part of the intermediate driving shaft 5. A continuous and even reciprocal movement is transmitted to the carriage D on a horizontal plane from end to end of the guide rods 30 by the crank 46, rod 44, rocker 40 and link 43, and a vertical movement is transmitted to the carriage through means of the guide rods 30, cross arms 31, and the vertical rods 32 through means of the internal cams 33. Attached to the lower face of the carriage 28 is a plate 47. This passes over the fish delivered by the feeding carriage C when the carriage travels in the direction of arrow $a$, but as the carriage, together with the rods 30, cross arms 31 and rods 32, is lowered the moment the plate 47 passes behind the fish, it can readily be seen that it will engage the fish and feed it through the knives 38 when a return movement is transmitted to the carriage. The plate 47 is slotted in alignment with the knives 38, thus permitting free forward movement of the plate 47 when feeding the fish through the knives.

The feeler plate serves an important function as it carries a plurality of feeler shoes such as generally indicated at 50. The two outermost shoes are longer or extended as indicated at 51 and serve the function of actuating a trip mechanism such as generally disclosed in Fig. 2; that is, the tail end of the fish passes between the cutting knives indicated at $38^a$, $38^b$ and $38^c$; and it is desired to automatically eject these tail sections unless they are up to proper size. The feeler fingers 50 and 51 are supported by rods 52 which in turn are vertically movable in the feeler plate 29. The feeler fingers normally assume a predetermined depressed position by being pulled downwardly by springs 53. The rods 52, together with the plates 50 and 51, are thus yieldingly supported and will rise upwardly when engaging the fish, but if the tail end of the fish is too small to engage the fingers 51, no upward movement will take place and the fingers 51 will, therefore, engage a bell crank indicated at 54 (see Fig. 2). This bell crank when engaged rocks about its pivot and exerts a pull on a latch rod 55. This rod normally supports a trap door 56 in raised and closed position, but when retracted permits the trap door to drop by gravity and thereby open. A small section of fish or a tail piece will, therefore, drop through and it is in this manner automatically ejected. The door 56 is closed the moment the carriage D has advanced beyond the same and it will remain closed until fish is again passed through the knives. If the tail sections are up to size, finger 51 will not engage the bell crank 54 and the trap door will remain closed, but if the tail pieces are again too small, finger 51 will engage the bell crank 54 and the trap door 56 will thus open. As previously stated, the trap door is automatically closed after each operation, this being accomplished by providing an arm 57 which is supported as at 58 below the table. This arm carries a downwardly depending rod 59 on the lower end of which is journalled a roller 60. This roller is engaged by a mutilated cam 61; that is, the cam is made in sections as shown in Fig. 2 and as the cam is secured to the shaft 6 and rotates continuously therewith, it will close the door 56 once during each revolution of the shaft and it will at the same time present a void or interrupted section of the cam as indicated at 62 when the carriage D is feeding the fish through the cutters, thus permitting the trap door to open if released.

Figure 4:
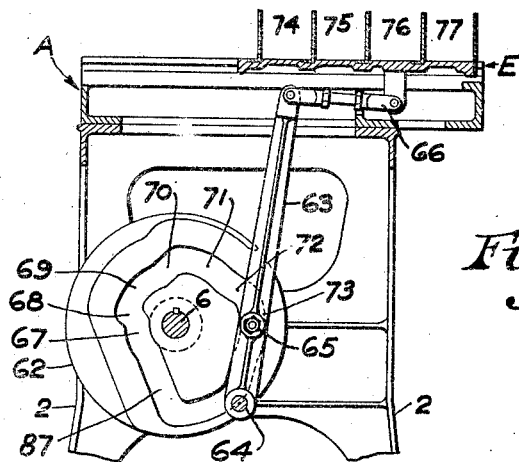
Fig. 4 is a cross-section partly broken away, showing the discharging carriage and the cam whereby it is actuated.

The spacing between the cutting knives 38 is such that the fish is cut into a series of sections of predetermined length. These sections are delivered to a discharging carriage generally indicated at E. This carriage is clearly illustrated in Figs. 1, 4 and 5. This carriage is also reciprocally mounted in a manner similar to the feeding carriage C, the only difference being that one reciprocal stroke is intermittent and steplike, while the return stroke is quick and continuous. This movement is transmitted from an internal cam 62 (see Fig. 4). This cam has five stop portions and five advancing portions. It actuates a rocker arm 63 pivotally secured to the end frame as indicated at 64. This rocker arm carries a roller 65, which projects into the cam groove and it is through this roller that movement is transmitted to arm 63 and the discharging carriage E, the connection between the arm 63 and the carriage E being indicated at 66. The portion of the cam indicated at 67 registers with the roller 65 when fish is delivered to carriage E by means of carriage D, this being the first rest period of the cam. The cam is then provided with an advance indicated at 68; a rest period as indicated at 69; a second advance at the point indicated at 70; a rest period at the point indicated at 71; a third advance portion as indicated at 72; a rest period as indicated at 73, and so on; that is, under normal conditions the fish is cut into four sections and these four sections are delivered to the respective compartments indicated at 74, 75, 76 and 77 formed on the carriage E, and as the carriage E is advanced with a step by step movement with an intermediate rest period between each movement, it is obvious that each section of fish may be removed during the rest period. This is an important feature of the present invention as it is desired to correctly position the fish and then to deliver the fish in this position to a discharging conveyor generally indicated at F. This conveyor consists of an endless sprocket chain 80 provided with carrier lugs 81, the chain being supported on sprocket gears 82 and 83 at opposite ends as shown and being driven from the intermediate drive shaft 5 by means of a sprocket chain 84.

The carrier lugs 81 are so spaced and timed that they will successively enter the compartments 74, 75, 76 and 77 as these compartments advance and align in successive order with the discharging conveyor. The fish is first of all properly positioned when it reaches the compartments 74, 75, 76 and 77, and as it is removed by the carrier lugs 81 while assuming this position, it is obvious that this position will be retained with relation to the carrier lugs 81 and that the fish will be discharged in this position of the receiving chute or hopper 86. This hopper forms a part of a filling machine not here illustrated; that is, it is essential that the fish is delivered to the hopper 86 in a predetermined position as cross-packing of the fish is in this manner prevented.

The cam 62 imparts four intermittently advance movements to the carriage E in one direction and also produces four rest periods, one between each advance, and it is during the rest period that the carrier lugs 81 enter the compartments and remove the fish. The return movement of the carriage is continuous and is imparted to the roller 62 and the rocker arm 63 by that portion of the cam indicated at 87. The moment it is returned it assumes the rest period indicated at 67, and the cut fish is delivered to the discharging carriage E when this rest period is assumed. It is then advanced by the cam portion 68 and reaches its second rest period at the point indicated at 69; the successive advance periods and rest periods being clearly illustrated in Fig. 4.

The carriage D, as previously stated, consists of two sections such as indicated at 28 and 29; the section 29 being supported by the guide rods 4 and being reciprocally mounted thereon and also vertically movable therewith. The feeler plate 29 is also reciprocally and vertically movable in unison with the carriage 28, but it may here be stated that it has an independent vertical movement with relation thereto. This movement is imparted by a pair of stationary cams 90 disposed on each side of the main frame. These cams engage a pair of rollers 91 disposed one in each end of the feeler plate 29. During the return stroke of the carriage 28 and the feeler plate 29 guide rods 30 are elevated to a point where they align with the upper portion of the cam members 90. The guide rods, together with the carriage 28, are lowered when the end of the return stroke is reached and it is at this point that the plate 47 passes behind the fish delivered by the feeding carriage C. The rollers 91 will at this point engage the high portion 90$^a$ of the cams and the feeler plate, together with the rods 52 and the fingers 50 and 51, will thus remain in an elevated position, while the carriage 28 and the guide rods 30 are lowered. The moment they reach their lowered position, a forward movement is imparted to the carriage 28 and simultaneously to the feeler plate 29. The rollers, therefore, advance on the high portion 90$^a$ of the cams and they will also automatically lower themselves to normal position by travelling downwardly on the inclined portions of the cams 90 as indicated at 92. It is during this downward movement that the fingers 50 and 51 come into engagement with the fish, the fingers 51 being engaged by the fish remain in an elevated position and thus pass free of the bell crank 54 (see Fig. 2), but they will engage this bell crank if the tail piece of the fish is too small, the fingers 50 merely serving the function of holding the fish rigidly against the plate 47 when passing through the knives.

From the foregoing it can be seen that the fish may be delivered in sections such as indicated at 95 to the table B in any suitable manner. They are here placed by an operator on the feeding carriage C which delivers the fish one by one to a point in alignment with the reciprocating carriage D. It is here automatically engaged by the plate 47 of the carriage D and advances through the cutting knives 38, and after the fish is cut the continued movement of the carriage D delivers the fish to the discharging carriage E; that is, the fish is at this point cut into sections of predetermined length and each section is delivered to the respective compartments shown at 74, 75, 76 and 77. This carriage upon receiving the fish advances intermittently as previously described, thereby bringing each compartment into alignment with the discharging conveyor F. The carrier lugs 81 thus pass successively through the different compartments and thus remove the fish sections one by one. The carrier lugs in turn elevate the fish to the receiving hopper or chute 86, where it is fed by gravity to the filler machine not here shown.

Means are also employed for automatically stopping the machine if the chute 86 should happen to become completely filled. The means disclosed is a trip arm 93 pivotally mounted on the upper end of the chute 86 as at 94. The trip arm 93 is provided with a crank arm 95$^a$ and this is in turn connected through a rod 96 with the trip latch 14, (see Fig. 5) through means of a bell crank 97 and a rod 98. If the hopper or chute 86 becomes filled, the last fish deposited will be forced in under the trip arm 93 and a rocking movement will thus be transmitted to the crank arm 95. This movement is transmitted through the rod 96, bell crank 97 and rod 98 to rock the trip latch 14. Rocking movement of this latch releases the lever 11 and thus permits the spring 15 to expand and clutch C to assume released position. Pulley 7 will thus turn freely on the shaft and the machine will automatically come to a stop, and if it is again desired to start the machine it will be necessary to manually swing the lever 11 back to the full line position shown in Fig. 5. In other words, the machine is manually started, but it is automatically stopped when conditions so require.

While certain features of the present invention are more or less specifically illustrated, I wish it understood that various changes in form and proportion may be resorted to within the scope of the appended claims, similarly, that the materials and finish of the several parts employed may be such as the experience and judgment of the manufacturer may dictate or various uses may demand.

Having thus described my invention, what I claim and desire to secure by Letters Patent is—

1. In a machine of the character described, a plurality of cutting knives, means for delivering fish to the knives and for feeding the fish through and between the knives, and means for automatically ejecting undersized cuts.

2. In a machine of the character described, means for cutting a fish into a plurality of sections of predetermined lengths, and means for automatically ejecting short sections.

3. In a machine of the character described, means for cutting a fish into a plurality of sections of predetermined lengths, means for automatically ejecting short sections, and means for intermittently and successively delivering each section of predetermined length one by one to a conveyor.

4. In a machine of the character described, means for cutting a fish into a plurality of sections of predetermined length, and means for intermittently and successively delivering each section of predetermined length one by one to a conveyor.

5. In a machine of the character described, a discharge conveyor, means for cutting fish into a plurality of sections, and means for delivering the sections one by one to the conveyor and in a position where the cut ends of the sections will lie parallel with the sides of the conveyor.

6. In a machine of the character described, a fish feeding mechanism, a cutting mechanism adapted to cut the fish into a plurality of sections of predetermined length, a discharge conveyor, means for delivering the cut fish sections to the conveyor one by one, a receiving hopper into which the conveyor discharges, and means for automatically stopping the fish feeding mechanism when the hopper is filled.

7. In a machine of the character described, a fish feeding mechanism, a cutting mechanism adapted to cut the fish into a plurality of sections of predetermined length, a discharge conveyor, means for delivering the cut fish sections to the conveyor one by one, a receiving hopper into which the conveyor discharges, and means for automatically stopping the fish feeding mechanism, the cutting mechanism and the discharge conveyor when the hopper is filled.

8. In a machine of the character described, a main frame, a fish feeding carriage mounted thereon, means for imparting a reciprocal movement thereto, a plurality of interspaced cutting knives, a cutter feeding carriage reciprocally mounted adjacent the same and adapted to remove the fish from the feeding carriage, and also adapted to feed the fish through the cutting knives, a discharge conveyor, and means for delivering cut sections of fish one by one thereto.

9. In a machine of the character described, a main frame, a fish feeding carriage mounted thereon, means for imparting a reciprocal movement thereto, a plurality of interspaced cutting knives adapted to cut each fish into a plurality of sections of predetermined length, a discharging carriage, a cutter feeding carriage adapted to remove the fish from the feeding carriage and also adapted to feed the fish through the cutters and to deliver the cut fish sections to the discharging carriage, a discharge conveyor, and means for imparting a step by step movement to the discharging carriage in one direction to deliver the cut sections of fish to the discharging conveyor one by one.

10. In a machine of the character described, a main frame, a fish feeding carriage mounted thereon, means for imparting a reciprocal movement thereto, a plurality of interspaced cutting knives adapted to cut each fish into a plurality of sections of predetermined length, a discharging carriage, a cutter feeding carriage adapted to remove the fish from the feeding carriage and also adapted to feed the fish through the cutters and to deliver the cut fish sections to the discharging carriage, a discharge conveyor, and means for imparting a step by step movement to the discharging carriage in one direction to deliver the cut sections of fish to the discharging conveyor one by one, said means also adapted to impart a continuous quick return movement to the discharge carriage in the opposite direction.

11. In a machine of the character described, a main frame, a fish feeding carriage mounted thereon, means for imparting a reciprocal movement thereto, a plurality of interspaced cutting knives adapted to cut each fish into a plurality of sections of predetermined length, a discharging carriage, a cutter feeding carriage adapted to remove the fish from the feeding carriage and also adapted to feed the fish through the cutters and to deliver the cut fish sections to the discharging carriage, a discharge conveyor, means for imparting a step by step movement to the discharging carriage in one direction to deliver the cut sections of fish to the discharging conveyor one by one, a receiving hopper into which the conveyor discharges the fish sections one by one, and means for automatically stopping the fish feeding, cutting and discharging mechanism when the hopper is full.

12. In a machine of the character described, the combination with the cutting knives and the cutter feeding carriage cooperating therewith, of a table by which the fish is supported and moved when passing through the knives, a trap door in said table, and means on the carriage for automatically releasing the trap door if short sections of fish are encountered.

13. In a machine of the character described, means for cutting a fish into a plurality of sections of predetermined length, means for automatically ejecting short sections, means for delivering each section of predetermined length to a conveyor, a hopper into which the conveyor discharges, and means for automatically stopping the fish cutting, the fish ejecting mechanism, and the conveyor when the hopper is filled.

14. In a machine of the character described, a fish cutting mechanism, means for delivering the cut sections of fish one by one to a conveyor, a hopper into which the fish sections discharge, and means for automatically stopping the conveyor when the hopper is filled.

ALBERT V. SULLIVAN.